United States Patent [19]
Lovelace et al.

[11] Patent Number: 5,930,311
[45] Date of Patent: Jul. 27, 1999

[54] CIRCUITRY FOR RETIMING A RECEIVED DATA SIGNAL

[75] Inventors: Gregory S. Lovelace, Sachse; Amanda G. Noe; David M. Smith, both of Plano, all of Tex.

[73] Assignee: Alcatel USA Sourcing, L.P., Plano, Tex.

[21] Appl. No.: 08/731,154

[22] Filed: Oct. 10, 1996

[51] Int. Cl.$^6$ ........................................... H04L 7/00
[52] U.S. Cl. .................. 375/354; 375/371; 326/96; 327/161
[58] Field of Search ..................... 375/354, 373, 375/371, 355, 356; 327/144, 141, 161, 163; 326/93; 370/518, 516, 503

[56] References Cited

U.S. PATENT DOCUMENTS

| | | | |
|---|---|---|---|
| 4,039,960 | 8/1977 | Clark | 327/144 |
| 4,535,459 | 8/1985 | Hogge, Jr. | 375/80 |
| 4,694,472 | 9/1987 | Torok et al. | 375/107 |
| 5,161,173 | 11/1992 | Nordby | 375/119 |
| 5,220,585 | 6/1993 | Sasaki et al. | 375/106 |
| 5,224,130 | 6/1993 | Mayo et al. | 375/120 |
| 5,369,672 | 11/1994 | Matsumoto | 375/354 |
| 5,412,311 | 5/1995 | Rothermel | 324/76.82 |
| 5,459,435 | 10/1995 | Taki | 331/1 A |
| 5,504,751 | 4/1996 | Ledzius et al. | 370/100.1 |
| 5,515,403 | 5/1996 | Sloan et al. | 375/371 |

*Primary Examiner*—Stephen Chin
*Assistant Examiner*—Betsy L. Deppe
*Attorney, Agent, or Firm*—Baker & Botts, L.L.P.

[57] ABSTRACT

A circuitry (10) is provided for automatically retiming a received synchronous data signal to a local clock. The circuitry (10) includes a first flip-flop (20) operable to register at least one synchronous data signal in response to a receive clock signal and to generate at least one data output signal. An OR gate (26) receives a data latch enable signal and a local clock signal. The local clock signal is frequency coherent with the receive clock signal. The OR gate (26) produces an enable signal. A latch (28) is coupled to the OR gate (26) for receiving the enable signal and in cascading arrangement with the first flip-flop (20). The latch (28) latches the data output signal on the falling edge of the local clock signal when the data latch enable signal is low. The latch (28) holds the latched data output signal as long as the local clock signal and the data latch enable signal are low. When either the local clock signal or the data latch enable signal is high, the latch (28) passes the data output signal. A second flip-flop (30), coupled in cascading arrangement with the latch (28), registers the data output signal passed through the latch (28) in response to the local clock signal. The signal output by the second flip-flop (30) is timed to the local clock signal.

12 Claims, 3 Drawing Sheets

CIRCUITRY FOR RETIMING A RECEIVED DATA SIGNAL

TECHNICAL FIELD OF THE INVENTION

This invention relates in general to the field of timing circuitry. More particularly, the present invention relates to circuitry for retiming a received data signal.

BACKGROUND OF THE INVENTION

Synchronous systems require dependable timing signals to operate properly and correctly receive data. Typically, synchronous data transported from one point to another is timed according to a synchronizing clock signal that is transported along with the data. In prior systems and methods, when the transported synchronous data and clock signal were received at a local system, the receive clock signal was distributed to all parts of the local system which operated on the received synchronous data so that the data could be correctly received or interpreted at each of these parts. In many cases, however, these parts of the local system are operated on a local clock, which could be out of phase with the receive clock. The difference in phase between the two clocks made it difficult or impossible for the parts of the local system to use the received data.

SUMMARY OF THE INVENTION

In accordances with present invention, the disadvantages and problems associated with correctly receiving a synchronous data signal have been substantially reduced or eliminated.

In one aspect of the invention, a circuit is provided for automatically retiming a received synchronous data signal to a local clock. The circuitry includes a first flip-flop operable to register at least one synchronous data signal in response to a receive clock signal and to generate at least one data output signal. An OR gate receives a data latch enable signal and a local clock signal. The local clock signal is frequency coherent with the receive clock signal. The OR gate produces an enable signal. A latch is coupled to the OR gate for receiving the enable signal and in cascading arrangement with the first flip-flop. The latch latches the data output signal on the falling edge of the local clock signal when the data latch enable signal is low. The latch holds the latched data output signal as long as the local clock signal and the data latch enable signal are low. When either the local clock signal or the data latch enable signal is high, the latch passes the data output signal. A second flip-flop, coupled in cascading arrangement with the latch, registers the data output signal passed through the latch in response to the local clock signal. The signal output by the second flip-flop is timed to the local clock signal.

A technical advantage of the present invention includes using a single circuit to retrieve a relatively large number of parallel synchronous signals. This is accomplished by receiving a plurality of synchronous signals at a circuit comprising a first delay flip-flop, a latch, and a second delay flip-flop coupled in cascading arrangement. Each of the first flip-flop, the latch, and the second flip-flop may have multiple inputs and outputs to support a large number of received signals. The signals are registered at the first flip-flop according to a receive clock signal and then retimed at the latch and second flip-flop according to a local clock signal and a data latch enable signal. Because each of the first flip-flop, the latch, and the second flip-flop support multiple signals, the circuitry used to retime the relatively large number of signals is minimized. Furthermore, because the circuit retimes the received signals, the signals can be used throughout a system local to the circuit without the need to distribute the receive clock.

BRIEF DESCRIPTION OF THE DRAWINGS

For a better understanding of the present invention, reference may be made to the accompanying drawings, in which.

DETAILED DESCRIPTION OF THE INVENTION

Figure 1:
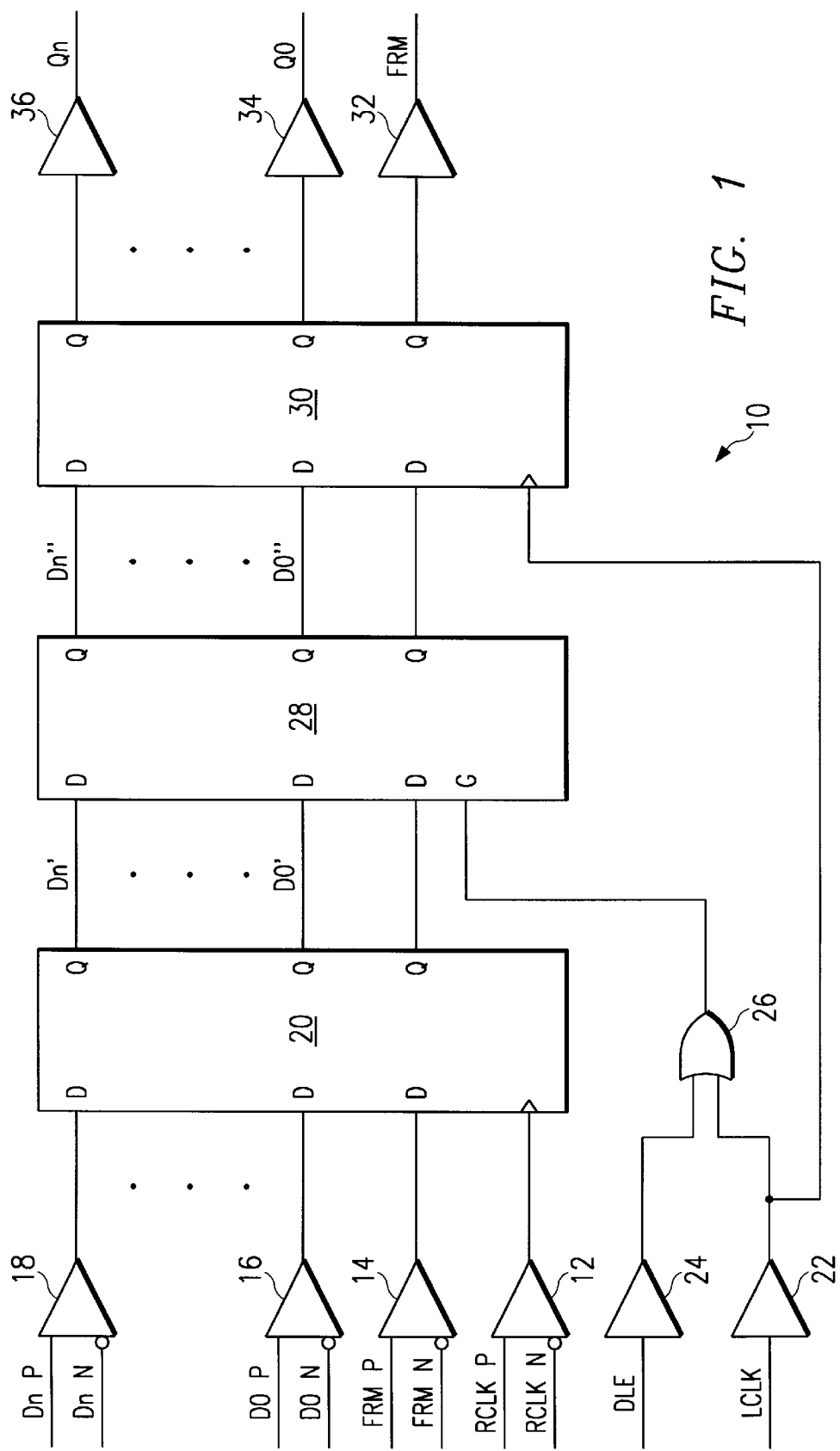
FIG. 1 is a simplified block diagram of a retiming circuit according to one embodiment of the present invention.
Figure 2A:
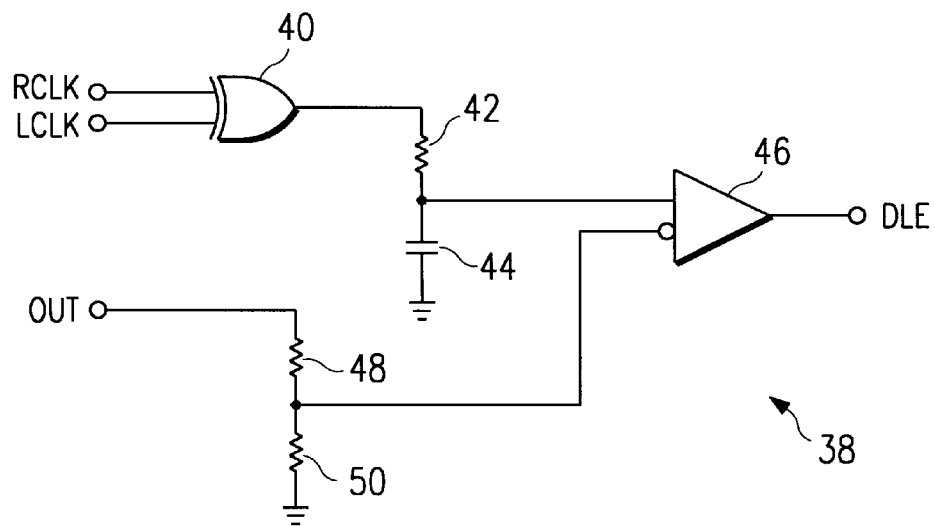
FIGS. 2A and 2B illustrate schematic diagrams for alternative intelligent circuits for generating a data latch enable signal.
Figure 2B:
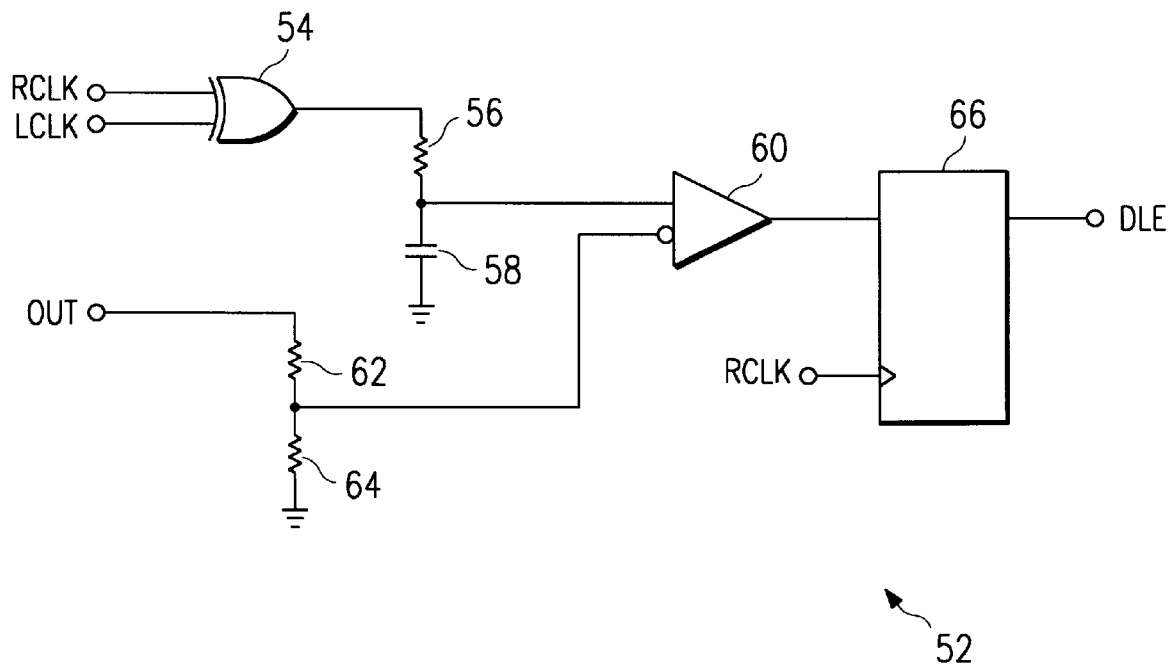

The preferred embodiment of the present invention and its advantages are best understood by referring to FIGS. 1, 2A, and 2B of the drawings, like numerals being used for like and corresponding parts of the various drawings.

FIG. 1 illustrates a circuit 10 for retiming received synchronous data signals according to an embodiment of the present invention. Circuit 10 includes a plurality of data receivers, such as differential data receivers 12, 14, 16, and 18. Each differential data receiver includes a "P" input and an "N" input for receiving a pair of synchronous differential bit signals. Each of differential data receivers 12, 14, 16, and 18 functions to convert the differential bit signals that it receives into a single-ended signal. In particular, a differential data receiver typically outputs a high signal if the signal received at the "P" input is high and the signal received at the "N" input is low. If the signal received at the "P " input is low and the signal at the "N" input is high, however, the differential data receiver outputs a low signal.

As shown in FIG. 1, differential data receiver 12 may receive a differential receive clock (RCLK) signal comprising bit signals receive clock P and receive clock N. Differential data receiver 14 may receive a differential frame (FRM) signal, which comprises a frame P and a frame N bit signals. Each of the remaining differential data receivers functions to receive a synchronous differential data signal comprising a P and an N bit signal. For example, differential data receivers 16 and 18 receive differential data signals D0 and Dn, respectively. The differential signals (i.e., the receive clock signal, the frame signal, and the various data signals) can be transported and received in parallel. In one embodiment of the present invention, circuit 10 may include eighteen differential data receivers for receiving the differential bits of each of the receive clock signal, the frame signal, and sixteen parallel data signals.

A first delay flip-flop 20 is coupled to each of the differential data receivers 12–18. Delay flip-flop 20 includes a clock input and a plurality of data inputs. The clock input is operable to receive the single-ended receive clock signal output by differential data receiver 12. One of the data inputs is operable to receive the single-ended frame signal output by differential data receiver 14. The remaining data inputs are operable to receive the single-ended data signals output by the remaining differential data receivers, including differential data receivers 16 and 18. In one embodiment, delay flip-flop 20 may comprise seventeen data inputs to receive the frame signal and sixteen synchronous data signals. The frame and data signals may be received in parallel. Delay flip-flop 20 also includes a plurality of outputs.

A data receiver 22 and a data receiver 24, each of which includes a single input, are operable to receive a single-ended local clock (LCLK) signal and a single-ended data latch enable (DLE) signal, respectively. Preferably, the local clock signal is frequency coherent with the receive clock signal. In other words, the local and receive clocks preferably are in a fixed nominal phase relationship, with controlled jitter and wander. The value (high or low) of the data latch enable signal is determined by the relationship between the receive clock and local clock signals. In one embodiment, as shown and described in more detail with reference to FIG. 2A, intelligent circuitry is operable to hold the data latch enable signal high or low. In another embodiment, as shown and described in more detail with reference to FIG. 2B, intelligent circuitry synchronizes the data latch enable signal with the receive clock signal. The local clock and data latch enable signals output by data receivers 22 and 24, respectively, are input into an OR gate 26, which outputs a single-ended enable signal in response.

A latch 28 is coupled in cascading arrangement with delay flip-flop 20. Latch 28 includes a number of inputs, including an enable (G) input and a plurality of data inputs. The enable input is operable to receive the signal output by OR gate 26. The enable input causes latch 28 to latch and hold data inputs for output when such signal is low; in all other cases, data inputs pass through latch 28 transparently. The data inputs of latch 28 are operable to receive in parallel the data and frame signals output by delay flip-flop 20. Latch 28 also comprises a plurality of outputs which are coupled to the parallel inputs of a second delay flip-flop 30.

Delay flip-flop 30 is coupled in cascading arrangement with latch 28. Delay flip-flop 30 includes a clock input and a plurality of data inputs. The clock input receives the local clock signal. The data inputs receive in parallel the frame and data signals output by latch 28. Generally, the operation of delay flip-flop 30 is similar to the operation of delay flip-flop 20 described above. Rather than operating off the receive clock signal like delay flip-flop 20, however, delay flip-flop 30 operates off the local clock signal. More specifically, delay flip-flop 30 registers the frame and data information received from latch 28 on the rising edge of the local clock signal. Delay flip-flop 30 outputs a plurality of signals which are essentially the frame and data signals delayed another time.

A plurality of data drivers, including data drivers 32, 34, and 36, are coupled to the outputs of delay flip-flop 30. These data drivers receive the delayed data and frame signals output by delay flip-flop 30. Each data driver may be implemented as a tri-state buffer.

FIGS. 2A and 2B illustrate schematic diagrams for alternative intelligent circuits for generating the data latch enable signal shown in FIG. 1.

Referring to FIG. 2A, intelligent circuitry 38 may include an exclusive OR gate 40 which receives the receive clock signal and the local clock signal at its inputs. A resistor 42 and a capacitor 44 are coupled to the output of exclusive OR gate 40. Intelligent circuitry 38 also receives a predetermined threshold or OUT signal, which is coupled to resistor 48 and resistor 50. One input of a differential data receiver 46 is coupled between resistor 42 and capacitor 44. The other input of differential data receiver 46 is connected between resistors 48 and 50. Differential data receiver 46 outputs the data latch enable (DLE) signal.

Intelligent circuitry 38 functions to hold the data latch enable signal either high or low. More specifically, intelligent circuitry 38 performs an "exclusive OR" operation on the local clock and the receive clock signals, and then compares the output against the OUT signal. For each set of receive clock, frame, and data signals received by retiming circuit 10 shown in FIG. 1, intelligent circuitry 38 holds the data latch enable signal either high or low.

FIG. 2B illustrates intelligent circuitry 52 which may also be used to generate the data latch enable signal shown in FIG. 1. Intelligent circuitry 52 comprises a number of elements, including an exclusive OR gate 54, a resistor 56, a capacitor 58, a differential data receiver 60, and resistors 62 and 64, which are substantially similar to the elements within intelligent circuitry 38 illustrated and described above with reference to FIG. 2A. Intelligent circuitry 52 also includes a latch 66. In one embodiment, latch 66 may be an edge-triggered D-type latch. Latch 66 receives the output from differential data receiver 60 and is driven by the receive clock signal. Latch 66 outputs the data latch enable signal.

Intelligent circuitry 52 synchronizes the generation of the data latch enable signal with the receive clock. Intelligent circuitry 52 adjusts the data latch enable signal in response to jitter and wander in retiming circuit 10 so that data is not lost. Specifically, if the data latch enable signal is synchronized with the receive clock, then retiming circuit 10 is more tolerant of higher jitter and wander because of dynamic switching of latch 28 shown in FIG. 1.

Figure 3A:
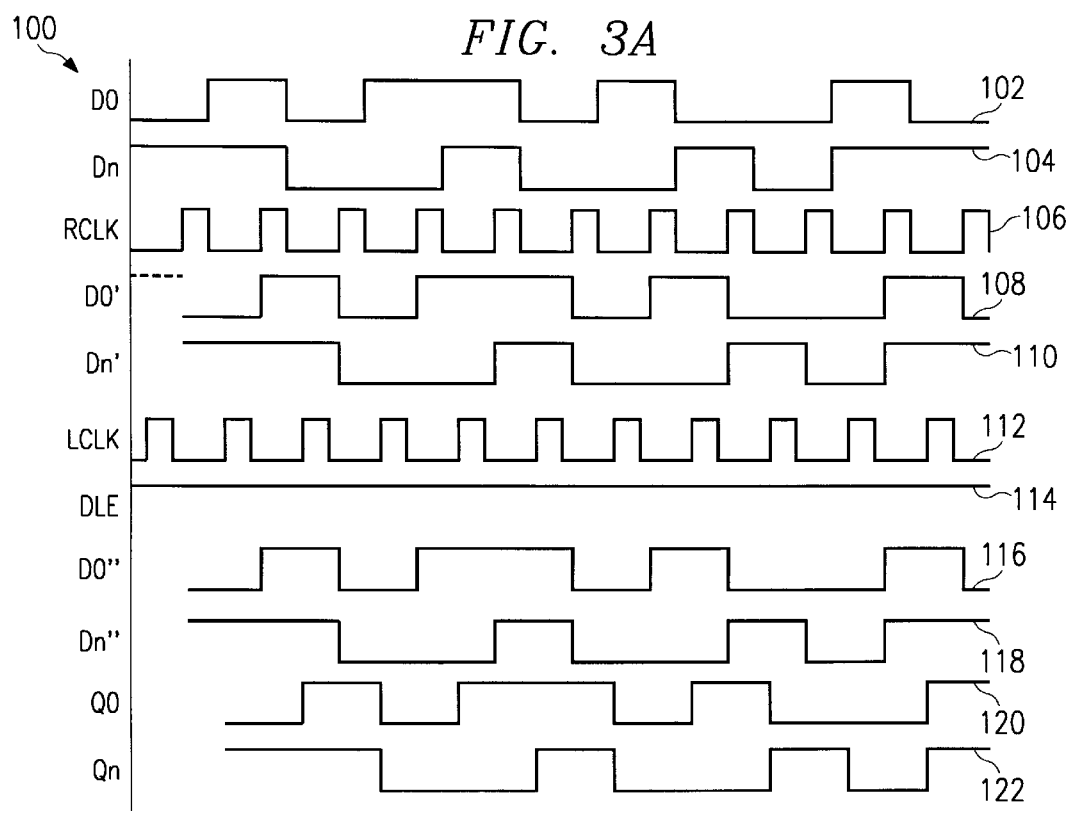
FIGS. 3A and 3B are timing diagrams which illustrate the retiming of exemplary received synchronous data signals according to an embodiment of the present invention.
Figure 3B:
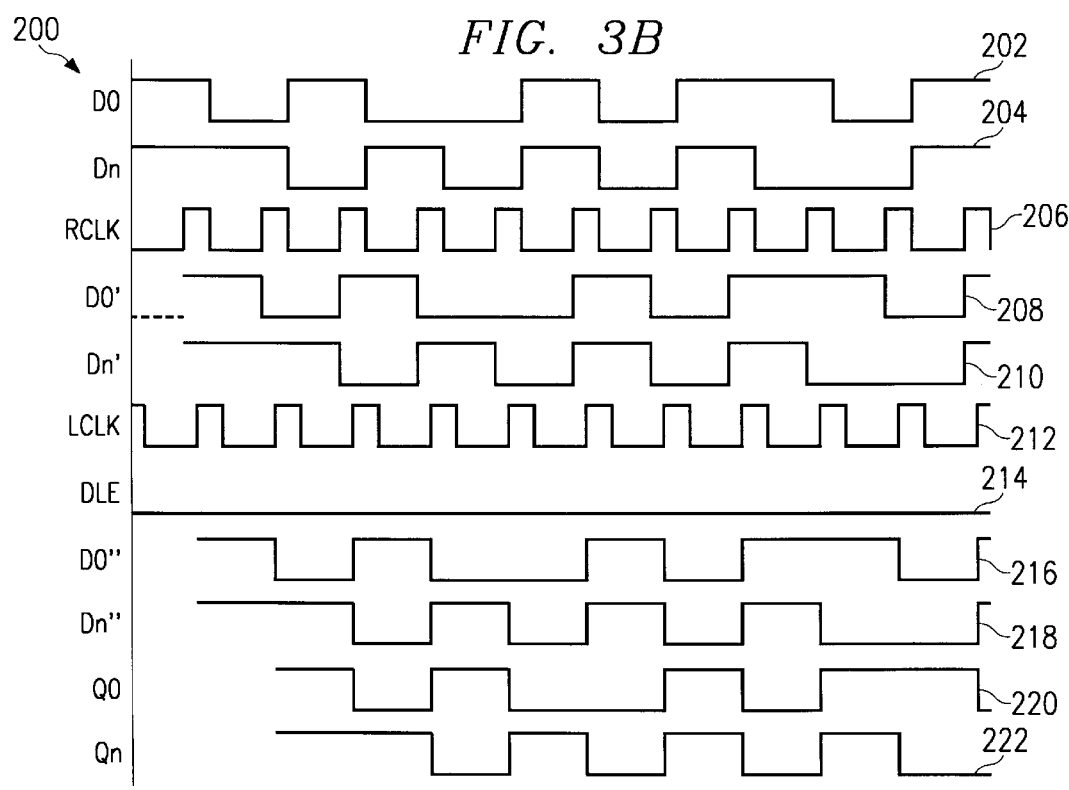

In operation, circuit 10 retimes received synchronous data and frame signals to operate with the local clock signal rather than the receive clock signal. In particular, delay flip-flop 20 registers the information contained in the single-ended frame and data signals received from differential data receivers 14–18 on the rising edge of the single-ended receive clock signal received from differential data receiver 12, as illustrated in FIGS. 3A and 3B. Delay flip-flop 20 outputs a plurality of synchronous single-ended frame and data signals, which are essentially the frame and data signals delayed in time. Latch 28 receives the plurality of frame and data signals output by delay flip-flop 20. Latch 28 operates in two modes, one corresponding to a high data latch enable signal and the other corresponding to a low data latch enable signal. In the first mode of operation, when the data latch enable signal is high, latch 28 operates transparently and the signals output by delay flip-flop 20 appear at the outputs of latch 28 without significant delay. In the second mode of operation, when the data latch enable signal is low, information in the frame and data signals is held at the outputs of latch 28 while the local clock signal is low. Then, as long as the local clock signal remains low, the information of the data and frame signals will be held in latch 28 and its associated outputs. When the local clock signal goes high, data at the inputs of latch 28 will be enabled or passed through latch 28 after a small amount of delay, i.e., latch 28 is transparent. The first and second modes of operation for latch 28 are shown and described below in more detail with reference to FIGS. 3A and 3B, respectively. Delay flip-flop 30 registers the frame and data signals passed through or held by latch 28 on the rising edge of the local clock. As the data and frame signals are passed through delay flip-flop 20, latch 28, and delay flip-flop 30, the signals are retimed to the local clock signal. Consequently, the data and frame signals can be used within a system that is local to circuit 10 without having to distribute the receive clock signal.

FIGS. 3A and 3B are timing diagrams which illustrate the retiming of exemplary received synchronous data signals according to an embodiment of the present invention. Referring to FIG. 3A, a timing diagram 100 illustrates the operation of circuit 10 when latch 28 is in its first mode of operation, i.e., when the data latch enable signal is high. A D0 signal 102 and a Dn signal 104 are exemplary waveform signals which can be input into the data inputs of delay flip-flop 20. A receive clock signal 106, which is an exemplary receive clock signal, may be input into the clock input of delay flip-flop 20. On the rising edge of receive clock signal 106, delay flip-flop 20 latches the information in D0 signal 102 and Dn signal 104 to output a D0' signal 108 and Dn' signal 110, respectively, which appear at two of the outputs of delay flip-flop 20. The waveforms of signals 108 and 110 are substantially similar to the waveforms of signals 102 and 104, respectively, but delayed in time. Signals 108 and 110 are input into two of the data inputs of latch 28.

A local clock signal 112 and a data latch enable signal 114 are exemplary waveform signals which can be input into OR gate 26. Local clock signal 112 is substantially the same frequency as receive clock signal 106, but differs in phase. Data latch enable signal 114 remains high. The output of OR gate 26 is input into the G input of latch 28. As stated before, in this first mode of operation when the data latch enable signal is high, latch 28 operates transparently. In other words, signals appearing at the data inputs of latch 28 appear almost immediately at the outputs of latch 28. Consequently, the waveforms of a D0" signal 116 and a Dn" signal 118 output by latch 28 are the same as the waveforms of signals 108 and 110, respectively, without significant delay. D0' signal 116 and Dn" 118 are input into delay flip-flop 30 along with local clock signal 112. Delay flip-flop 30 latches the information in D0" signal 116 and Dn" signal 118 on the rising edge of local clock signal 112.

A Q0 signal 120 and a Qn signal 122 are waveforms signals that are output by delay flip-flop 30 in response to local clock signal 112, D0" signal 116, and Dn" signal 118. The waveforms of signals 120 and 122 are the same as the waveforms of signals 116 and 118, respectively, except delayed.

FIG. 3A illustrates that although the waveform signals 102 and 104 input into delay flip-flop 20 are timed to the receive clock signal 106, the waveform signals 120 and 122 output by delay flip-flop 30 are retimed by circuit 10 to the local clock signal 112. Consequently, Q0 signal 120 and Qn signal 122 can be used within a system local to circuit 10 and operating on local clock signal 112 without the need to distribute receive clock signal 106.

FIG. 3B is a timing diagram 200 which illustrates the operation of circuit 10 when latch 28 is in its second mode of operation—i.e., when the data latch enable signal is low. A D0 data signal 202 and a Dn data signal 204 are exemplary waveform signals which can be input into the data inputs of delay flip-flop 20. An receive clock signal 206 may be input into the clock input of delay flip-flop 20. Delay flip-flop 20 latches the information in D0 signal 202 and Dn signal 204 on the rising edge of receive clock signal 206 to output a D0' signal 208 and a Dn' signal 210. The waveforms of signals 208 and 210 are substantially similar to the waveforms of signals 202 and 204, except delayed. These signals 208 and 210 are input into latch 28.

A local clock signal 212 and a data latch enable signal 214 are exemplary waveform signals which may be input into OR gate 26. In this second mode of operation, data latch enable signal 214 remains low. Consequently, as previously described, latch 28 latches information appearing at its data outputs whenever local clock signal 212 goes low. Whenever local clock signal 212 is high, latch 28 is transparent. This operation of latch 28 produces a D0" signal 216 and a Dn" signal 218, which are then input into delay flip-flop 30. Local clock signal 212 is also input into delay flip-flop 30. On the rising edge of local clock signal 212, delay flip-flop 30 registers the information in D0" signal 216 and Dn" signal 218 to output a Q0 signal 220 and a Qn signal 222. The waveforms of Q0 signal 220 and Qn signal 222 are the same as the waveforms of D0" signal 216 and Dn" signal 218, except delayed.

FIG. 3B illustrates that although the waveform signals 202 and 204 input into delay flip-flop 20 are timed to the receive clock signal 206, the waveform signals 220 and 222 output by delay flip-flop 30 are retimed to the local clock signal 212. Consequently, the signals 220 and 222 can be used throughout a system local to circuit 10 without having to distribute the receive clock signal.

Although the present invention and its advantages have been described in detail, it should be understood that various changes, substitutions, and alterations can be made herein without departing from the spirit and scope of the invention as defined by the appended claims.

What is claimed is:

1. A circuitry for automatically retiming a received synchronous data signal to a local clock signal comprising:
    a first flip-flop operable to register a synchronous data signal in response to a receive clock signal, the first flip-flop further operable to generate a data output signal;
    an OR gate operable to receive a data latch enable signal and the local clock signal, the local clock signal being frequency coherent with the receive clock signal, the OR gate operable to produce an enable signal;
    a latch coupled to the OR gate for receiving the enable signal and further coupled in cascading arrangement with the first flip-flop, the latch operable to hold information of the data output signal on the falling edge of the local clock signal when the data latch enable signal is low, the latch further operable to hold the information of the data output signal as long as the local clock signal and the data latch enable signal are low, the latch further operable to pass the data output signal when either the local clock signal or the data latch enable signal is high; and
    a second flip-flop coupled in cascading arrangement with the latch, the second flip-flop operable to register the data output signal passed through the latch in response to the local clock signal.

2. The circuit of claim 1, further comprising:
    a first differential data receiver coupled to the first flip-flop, the first differential data receiver operable to receive a differential receive clock signal, the first differential data receiver operable to convert the differential receive clock signal to a single-ended receive clock signal; and
    a second differential data receiver coupled to the first flip-flop, the second differential data receiver operable to receive a differential data signal, the second differential data receiver operable to convert the differential data signal to a single-ended data signal.

3. The circuit of claim 1, further comprising a data driver coupled to the second flip-flop, the data driver operable to receive the data output signal from the second flip-flop.

4. The circuit of claim 3, wherein the data driver includes a tri-state buffer.

5. The circuit of claim 1, wherein each of the first flip-flop, the latch, and the second flip-flop comprises a plurality of inputs for processing of a plurality of synchronous data signals.

6. The circuit of claim 1, wherein the value of the data latch enable signal depends on the relationship between the receive clock signal and the local clock signal.

7. The circuit of claim 1, further comprising intelligent circuitry operable to output the data latch enable signal.

8. A circuitry for automatically retiming a plurality of received synchronous data signals to a local clock signal, comprising:

a first delay flip-flop operable to register in parallel the plurality of synchronous data signals in response to a receive clock signal which is frequency coherent with the local clock signal, the first delay flip-flop further operable to generate a plurality of data output signals;

a latch coupled in cascading arrangement with the first delay flip-flop, the latch operable to hold in parallel the data output signals on the falling edge of the local clock signal when a data latch enable signal is low, the latch further operable to hold the data output signals as long as the local clock signal and the data latch enable signal are low, the latch further operable to pass the data output signals when either the local clock signal or the data latch enable signal is high; and a second delay flip-flop coupled in cascading arrangement with the latch, the second delay flip-flop operable to register in parallel the data output signals passed through the latch in response to the local clock signal.

9. The circuit of claim 8, further comprising a plurality of differential data receivers coupled to the first delay flip-flop, the differential data receivers operable to receive in parallel a plurality of differential signals, the differential data receivers further operable to convert the differential signals to single-ended signals.

10. The circuit of claim 8, further comprising a plurality of data drivers coupled to the second delay flip-flop, the data drivers operable to receive in parallel a plurality of data signals from the second delay flip-flop.

11. The circuit of claim 8, further comprising an OR gate coupled to the latch, the OR gate operable to receive the data latch enable signal and a local clock signal, the OR gate further operable to produce an output signal.

12. The circuit of claim 8, further comprising intelligent circuitry for generating the data latch enable signal.

\* \* \* \* \*